United States Patent [19]
Iwamoto

[11] Patent Number: 5,859,950
[45] Date of Patent: Jan. 12, 1999

[54] INFORMATION RECORDING DEVICE AND INFORMATION OUTPUT DEVICE

[75] Inventor: Koji Iwamoto, Nara, Japan

[73] Assignee: Matsushita Electric Industrial Co., Ltd., Osaka-fu, Japan

[21] Appl. No.: 733,327

[22] Filed: Oct. 17, 1996

[30] Foreign Application Priority Data

Oct. 18, 1995 [JP] Japan ................................. 7-270237

[51] Int. Cl.$^6$ .............................. H04N 5/91; H04N 7/00
[52] U.S. Cl. ................................. 386/94; 386/46
[58] Field of Search ................................. 386/46, 94, 96, 386/1, 4, 52; 260/13, 15; 380/5, 10, 7, 3, 11, 15; H04N 5/91, 7/00

[56] References Cited

U.S. PATENT DOCUMENTS 4,644,422  2/1987  Bedini .
5,627,655  5/1997  Okamoto et al. ........................ 386/94

*Primary Examiner*—Robert Chevalier
*Attorney, Agent, or Firm*—Wenderoth, Lind & Ponack, L.L.P.

[57] ABSTRACT

An MPU 1 decomposes video-audio information which is externally inputted and stored into a second temporary storage area 32 for each parameter included in a sequence layer and the like, and further into video information and audio information, and stores the information into a third temporary storage area 33. Next, the MPU 1 extracts a predetermined quality deterioration parameter from the parameters stored in the third temporary storage area 33 and stores a prescribed value in the storage area in which that quality deteriaration parameter was stored. The MPU 1 then composes the video-audio information stored in the third temporary storage area 33 again and stores the composed video-audio information (quality deteriorated) into a fourth temporary storage area 34. Next, the MPU 1 outputs the video-audio information (quality deteriorated) stored in the fourth temporary storage area 34 to a first recording device 4 and causes the first recording device 4 to write the video-audio information (quality deteriorated) on a copy target recording medium 4. Thus the size of the display screen of the video-audio information (quality deteriorated) differs from that of the video-audio information externally inputted.

41 Claims, 6 Drawing Sheets

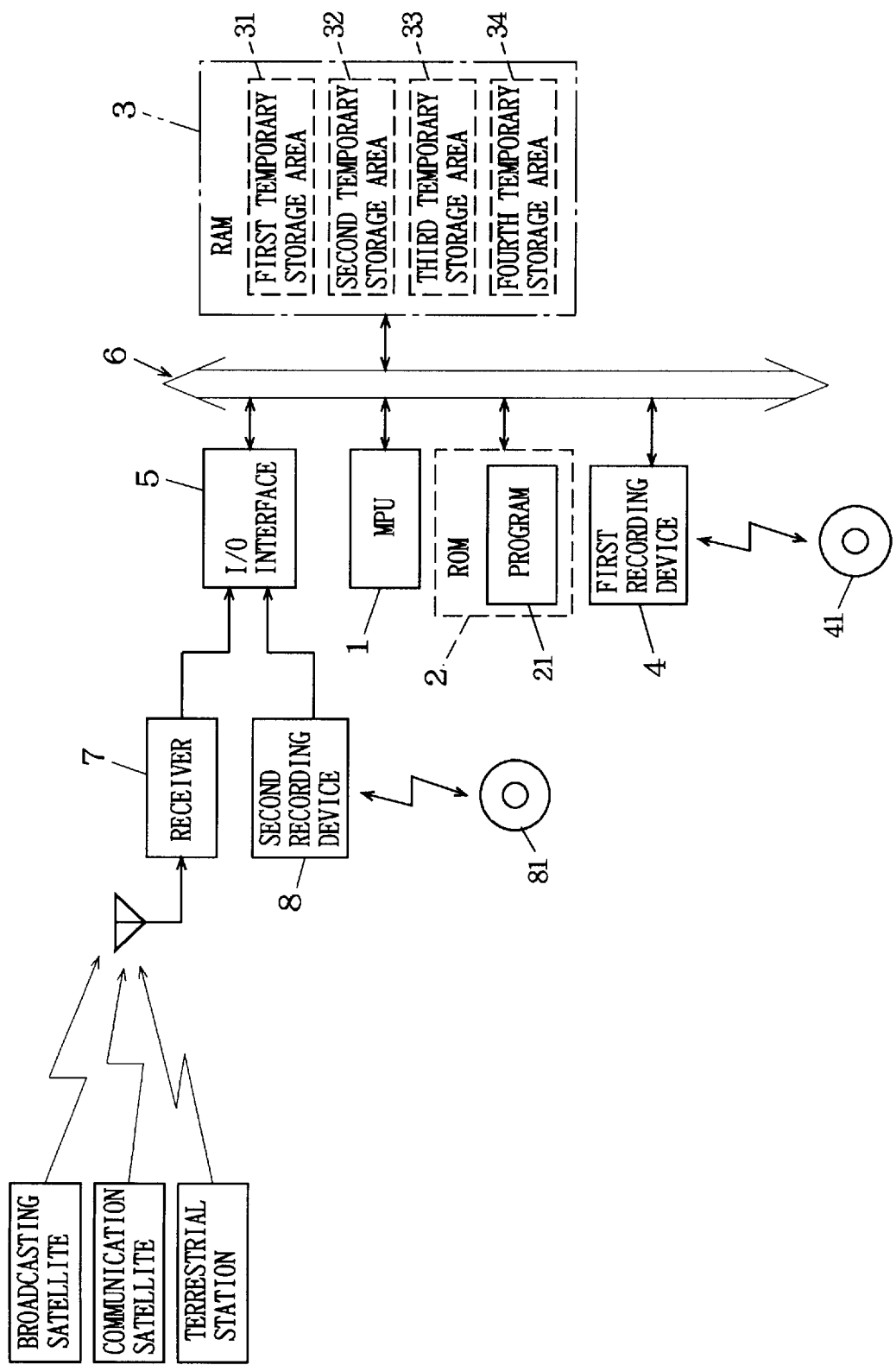

INFORMATION RECORDING DEVICE AND INFORMATION OUTPUT DEVICE

BACKGROUND OF THE INVENTION

1. Field of the Invention

The present invention relates to information recording devices and information output devices, and more particularly to an information recording device which records digital information inputted in the on-line, off-line or broadcasting form on a copy target recording medium with its quality deteriorated, and an information output device for externally outputting the information with its quality deteriorated.

2. Description of the Background Art

In a conventional information recording device, when video information, audio information or video-audio information digitally recorded on a copy source recording medium is copied on a copy target recording medium, the video-audio information of the copy has completely the same quality as the original video-audio information. Referring to the figure, the procedure for making a copy in the conventional information recording device will now be described.

FIG. 6 is a block diagram showing the structure of the conventional information recording device. In FIG. 6, the information recording device 60 includes an original recording medium 61, an information reading portion 63, an information writing portion 64 and a copy target recording medium 65.

The original recording medium 61 has video-audio information (original) 62 which is digital information recorded thereon. The video-audio information 62 has the recording system including auxiliary information such as header information, error correction information, etc. in addition to video information and/or audio information, as MPEG (Motion Picture Experts Group) 2 stream format, for example.

The information reading portion 63 reads the video-audio information (original) 62 from the original recording medium 61 in order according to its recording system. The video-audio information (original) 62, which is digital information, presents a train of "0's" and "1's". The information writing portion 64 records the video-audio information (original) 62 onto the copy target recording medium 65 in the order read out by the information reading portion 63. At this time, if the digital information read is "0", for example, it is of course recorded on the copy target recording medium 65 as "0". The information reading portion 63 and the information writing portion 64 proceed with the processing as above to produce video-audio information (copy) 66 having the same quality as the video-audio information (original) 62 on the copy target recording medium 65.

The use of the information recording device 60, however, allows anybody to easily make a copy of the video-audio information, or the like, regardless of intention of its copyright holder. Furthermore, the produced copy has the same quality as the original video-audio information. This may lead to an illegal sale of the copy on the market, producing -the problem that the copyright can not be effectively protected.

The technique for protecting the copyright above includes SCMS (Serial Copy Management System) provided in a deck for DAT (Digital Audio Tape) etc. and "ANTI-COPY SYSTEM" disclosed in U.S. Pat. No. 4644422.

As is well known, the SCMS mentioned above is a system for preventing a copy based on the digital information recorded on an original recording medium from being taken over like an endless chain. More specifically, when copy permitted/unpermitted information, which is indicative of whether copying is permitted or not permitted, indicates that copying is unpermitted, it prohibits copying the digital information. Thus unpermitted copying is prevented. However, the present invention is intended to protect copyrighted works by deteriorating the quality of digital information, so its basic point of view is different.

The above-mentioned "ANTI-COPY SYSTEM" superimposes deterioration signal having a frequency over the man's audible range on audio information which is the analogue form. The audio information with the deterioration signal superimposed is recorded on an original recording medium. When making a copy of such audio information, it is recorded onto a copy target recording medium with high-frequency signal from a bias oscillator further superimposed thereon. Accordingly, when the audio information recorded on the copy target recording medium is reproduced, the deterioration signal and the high-frequency signal interact with each other to generate higher harmonic which is unendurable to hear. Thus the ANTI-COPY SYSTEM prevents copying onto a copy target recording medium.

According to the aforementioned ANTI-COPY SYSTEM, however, it is possible to reproduce the audio information recorded on the copy target recording medium, but it can not be utilized. That is to say, it prevents personal usage which is not subject to the force of the copyright. Accordingly, it differs from the present invention which is intended to protect the copyright while permitting copying, and its problem solving means also differs.

SUMMARY OF THE INVENTION

Accordingly, it is an object of the present invention to provide an information recording device and an information output device capable of protecting copyrighted video information and/or audio information.

To achieve the object, the present invention has the following structures.

A first aspect of the present invention is directed to a device for recording digital information inputted in the on-line, off-line or broadcasting form on a copy target recording medium, wherein the digital information includes video information and/or audio information and parameters for reproducing the video information and/or the audio information as video and/or audio, and the information recording device includes, a decomposing portion for decomposing the inputted digital information in one or a plurality of certain parts;

an extracting portion for extracting part of the parameters as a quality deterioration parameter from the digital information decomposed by the decomposing portion;

a converting portion for converting the quality deterioration parameter extracted by the extracting portion into a certain value;

a composing portion for composing the digital information decomposed by the decomposing portion to produce digital information including the certain value in a portion corresponding to the quality deterioration parameter; and a writing portion for writing the digital information composed by the composing portion on the copy target recording medium.

As stated above, in the first aspect, the extracting portion extracts a quality deterioration parameter. The converting portion converts the extracted quality deterioration parameter into a certain value. The composing portion composes the digital information decomposed by the decomposing portion to produce digital information including the certain value in a portion corresponding to the quality deterioration parameter, and thus the quality of the produced digital information is deteriorated. That is to say, it is possible to deteriorate its quality as compared with the quality of the digital information inputted in the on-line form, or the like. Accordingly, the digital information written on the copy target recording medium is different in quality from the digital information inputted in the on-line form or the like. Thus the digital information inputted in the on-line form or the like, which is subject to the copyright, can be protected.

The information recording device according to the first aspect described above can further include a reading portion for reading digital information stored on a copy source recording medium, wherein the decomposing portion receives the digital information read by the reading portion as input. This protects copyright works recorded on various media such as DVD (Digital Video Disc) etc.

The converting portion in the first aspect may have the following structures.

As a first example, the digital information includes at least video information, and the extracting portion extracts as the quality deterioration parameter a parameter defining a screen size when the video information is reproduced as video from the digital information decomposed by the decomposing portion.

As a second example, the digital information includes at least video information, and the extracting portion extracts as the quality deterioration parameter a parameter defining the number of frames per unit time when the video information is reproduced as video from the digital information decomposed by the decomposing portion.

As a third example, the digital information includes at least video information, and the extracting portion extracts as the quality deterioration parameter a quantization matrix required when image-expanding the video information from the digital information decomposed by the decomposing portion.

As a fourth example, the digital information includes at least video information, and the extracting portion extracts as the quality deterioration parameter a parameter relating to a motion vector when decoding the video information from the digital information decomposed by the decomposing portion.

As a fifth example, the digital information includes at least video information, and the extracting portion extracts as the quality deterioration parameter a parameter defining the resolution when reproducing the video information as video from the digital information decomposed by the decomposing portion.

Further, as a sixth example, the digital information includes video information and audio information, and the extracting portion extracts as the quality deterioration parameter a parameter defining the relation between the video information and the audio information from the digital information decomposed by the decomposing portion.

The first aspect described above can be expanded in the following manners.

As a first manner, in the first aspect, permit/unpermit information is defined which is indicative of whether to permit writing the digital information inputted into the decomposing portion on the copy target recording medium without deteriorating quality of the digital information, and the information recording device further includes a determination portion for determining whether to write the digital information inputted to the decomposing portion on the copy target recording medium without deteriorating its quality on the basis of the permit/unpermit information externally inputted.

In the first manner, when the determination portion determines that the permit/unpermit information permits writing on the copy target recording medium, the digital information inputted to the decomposing portion can be written on the copy target recording medium without deteriorated in quality. This provides a convenient information recording device which enables production of a perfect copy of the inputted digital information for spare, for example. It is necessary that the permit/unpermit information is defined on the basis of approval of a copyright holder in view of protection of the copyright.

In a second manner, in the first aspect, the digital information inputted to the decomposing portion further includes number-of-times information indicative of the number of times the digital information can be written on the copy target recording medium without deteriorated in quality, wherein the information recording device further includes a determination portion for extracting the number-of-times information from the digital information decomposed by the decomposing portion and determining on the basis of the extracted number-of-times information whether to write the digital information inputted to the decomposing portion on the copy target recording medium without deteriorating its quality.

In the second manner, when the determination portion determines to write the digital information inputted to the decomposing portion on the copy target recording medium without deteriorating its quality on the basis of the number of times indicated by the number-of-times information, it is possible to make a perfect copy of the inputted digital information for spare, for example, thus providing a convenient information recording device. It is necessary to include the number-of-times information in the video-audio information with the approval of a copyright holder in view of protection of the copyright.

A second aspect of the present invention is directed to a device for recording digital information inputted in the on-line, off-line, or broadcasting form on a copy target recording medium, wherein the digital information includes at least video information and/or audio information, the video information and/or the audio information being composed of a plurality of unit information, wherein the information recording device includes;

a decomposing portion for decomposing the inputted digital information for each unit information;

an extracting portion for extracting unit information to be deteriorated in quality from the decomposed digital information;

a deteriorating portion for deteriorating the quality of the unit information extracted by the extracting portion;

a composing portion for composing the digital information decomposed by the decomposing portion to generate digital information including the unit information deteriorated in quality; and a writing portion for writing the digital information produced by the composing portion onto the copy target recording medium.

As stated above, in the second aspect, the extracting portion extracts unit information whose quality is to be deteriorated. The deteriorating portion deteriorates the quality of the extracted unit information. The composing portion composes the digital information decomposed by the decomposing portion to produce digital information including the unit information deteriorated in quality, thereby deteriorating the quality of the digital information produced. That is to say, it is possible to make its quality worse than the quality of the digital information inputted in the on-line form, or the like. Accordingly, the digital information written on the copy target recording medium has different quality from the digital information inputted in the on-line form, or the like. Thus the digital information inputted in the on-line form, or the like, which is a copyright work, can be protected.

Similarly to the information recording device according to the first aspect above, the information recording device according to the second aspect above may further include a reading portion for reading digital information recorded in a copy source recording medium, wherein the decomposing portion receives as input the digital information read by the reading portion, which protects copyrighted works recorded in various media.

The deteriorating portion in the second aspect can be constructed as follows.

As a first example, the digital information includes at least video information, and the extracting portion extracts the unit information to intermittently deteriorate the video information on a screen when the video information is reproduced as video.

As a second example, the digital information includes at least video information, and the extracting portion extracts the unit information to deteriorate the video information for each certain picture group when the video information is reproduced as video.

As a third example, the digital information includes at least video information, and the extracting portion extracts the unit information to deteriorate luminance and/or color in one or a plurality of certain parts on a screen when the video information is reproduced as video.

A third aspect of the present invention is directed to a device for deteriorating quality of digital information inputted in the on-line, off-line, or broadcasting form, wherein the digital information includes video information and/or audio information and parameters for reproducing the video information and/or the audio information as video and/or audio, wherein the information output device includes,
a decomposing portion for decomposing the inputted digital information in one or a plurality of certain parts;
an extracting portion for extracting part of the parameters as a quality deterioration parameter from the digital information decomposed by the decomposing portion,
a converting portion for converting the quality deterioration parameter extracted by the extracting portion into a certain value;
a composing portion for composing the digital information decomposed by the decomposing portion to produce digital information including the certain value in a part corresponding to the quality deterioration parameter; and
an output portion for outputting the digital information produced by the composing portion in the on-line, off-line or broadcasting form.

As stated above, in the third aspect, the extracting portion extracts a quality deterioration parameter. The converting portion converts the extracted quality deterioration parameter into a certain value. The composing portion composes the digital information decomposed by the decomposing portion to produce digital information including the certain value in a portion corresponding to the quality deterioration parameter, thus deteriorating the quality of the produced digital information. Hence, when the digital information outputted by the output portion is copied and the copy is reproduced, its quality is deteriorated. This protects the copyrighted digital information inputted in the on-line form, or the like.

The extracting portion in the third aspect may take the same structure as the extracting portion in the first aspect. The third aspect can be expanded in the same manner as the first aspect.

Furthermore, a fourth aspect of the present invention is directed to a device for deteriorating quality of digital information inputted in the on-line, off-line, or broadcasting form, wherein the digital information includes at least video information and/or audio information, the video information and/or the audio information being composed of a plurality of unit information, wherein the information output device includes,
a decomposing portion for decomposing the inputted digital information for each unit information;
an extracting portion for extracting unit information whose quality is to be deteriorated from the decomposed digital information;
a deteriorating portion for deteriorating the quality of the unit information extracted by the extracting portion;
a composing portion for composing the digital information decomposed by the decomposing portion to produce digital information including the unit information deteriorated in quality; and
an output portion for outputting the digital information produced by the composing portion in the on-line, off-line or broadcasting form.

As stated above, in the fourth aspect, the extracting portion extracts unit information to be deteriorated in quality. The deteriorating portion deteriorates the quality of the extracted unit information. The composing portion composes the digital information decomposed by the decomposing portion to produce digital information including the unit information deteriorated in quality. The quality of the produced digital information is thus deteriorated. Accordingly, when the digital information outputted by the output portion is copied and reproduced, its quality is deteriorated. Thus the copyrighted digital information inputted in the on-line form or the like can be protected.

The deteriorating portion in the fourth aspect may take the same structure as the deteriorating portion in the second aspect. The fourth aspect can be expanded in the same manner as the second aspect.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing structure of an information recording device according to a first embodiment of the present invention.

DESCRIPTION OF THE PREFERRED EMBODIMENTS

Figure 2A:
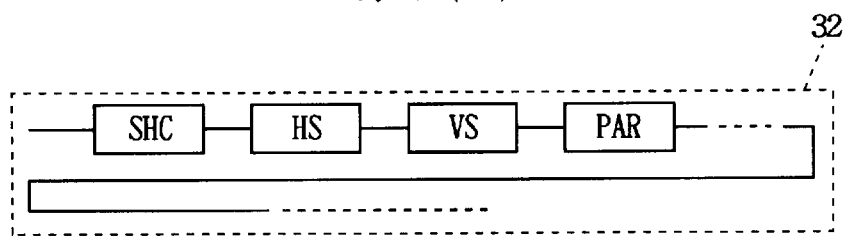
FIG. 2 is a diagram showing information stored in second to fourth temporary storage areas 32 to 34 included in the RAM 3 shown in FIG. 1.

FIG. 1 is a block diagram showing the structure of an information recording device according to a first embodiment of the present invention. In FIG. 1, the information recording device includes an MPU (Micro Processing Unit) 1, a ROM 2, a RAM 3, a first recording device 4, an I/O interface 5 and a system bus 6. The MPU 1, the ROM 2, the RAM 3, the first recording device 4 and the I/O interface 5 are connected through the system bus 6 to each other.

The MPU 1 performs processing (refer to FIG. 3) according to the program 21 stored in the ROM 2 to make a copy of original video-audio information supplied from the outside.

The RAM 3 is used as a work area for the processing performed by the MPU 1, which includes first to fourth temporary storage areas 31 to 34. The first temporary storage area 31 stores the program 21 read from the ROM 2. The second temporary storage area 32 stores the original video-audio information inputted from the outside. The third temporary storage area 33 stores information obtained by decomposing the video-audio information stored in the second temporary storage area 32. The fourth temporary storage area 34 stores video-audio information (quality deteriorated) to be recorded on a recording medium 41 included inside the first recording device 4. The video-audio information (quality deteriorated), which will be fully described later, means video-audio information whose quality is deteriorated as compared with the original video-audio information by the processing performed according to the program 21.

The first recording device 4 is a DVDD (Digital Video Disc Drive) or a deck for DVC (Digital Video Cassette) or an HDD (Hard Disk Drive), which receives the video-audio information (quality deteriorated) stored in the fourth temporary storage area 34 as input through the system bus 6 and writes it on the copy target recording medium 41 (DVD, DVC or HD) included therein.

The I/O interface 5 connects a receiver 7 and a second recording device 8 in this embodiment. The receiver 7 demodulates transmission signal received from a broadcasting satellite, a communication satellite, a terrestrial transmission station, etc. into digital information, i.e., video-audio information which is a bit string, and outputs the information to the I/O interface 5. The second recording device 8 is also a DVDD, for example, like the first recording device 4 explained above, which reads the video-audio information recorded in the copy source recording medium 81 (DVD etc.) included therein and outputs the information to the I/O interface 5.

Generally, a decoder for decoding video-audio information, a television for reproducing the decoded video-audio information as video and audio, and so forth, are also connected to the I/O interface 5, but they are neither described nor shown in the figures because they are not related to the invention.

Next, the aforementioned video-audio information will be described. The video-audio information includes video information and audio information. The video-audio information is formed of the MPEG (Motion Picture Experts Groups) 2 stream format having hierarchical structure, for example. That is to say, the video-audio information includes not only information relating to reproduced video and audio but also auxiliary information such as header information, error correction information, etc. More specifically, the video-audio information defines the relation between the video information and the audio information in the MPEG system layer which is an upper hierarchy. The video information also has a hierarchical structure, which has various parameters for enabling reproduction as video in addition to luminance information and color-difference information relating to video. More specifically, the video information is composed of the sequence layer, the GOP (Group Of Picture) layer, the picture layer, the slice layer, the macroblock layer and the block layer. These layers are described below.

(A) The MPEG system layer multiplexes an arbitrary number of discrete streams of video information and audio information to form one movie or the like. The MPEG system layer includes the following parameters relating to the relation between video and audio.

(1) As parameters for establishing synchronization of video and audio, PTS (Presentation Time Stamp), DTS (Decoding Time Stamp), etc. are defined.

(2) As a parameter relating to the relation between video and audio, the stream ID is defined. The stream ID is defined to enable video up to 16 channels and audio up to 32 channels.

(B) The sequence layer has those described below as parameters in a group of a series of frames having the same attribute when video information is reproduced as video.

(3) As parameters relating to the screen size of reproduced video, HSV (Horizontal Size Value), VSV (Vertical Size Value) and ARI (Aspect Ratio Information) are defined.

(4) The BRV (Bit Rate Value) is defined as a parameter relating to the bit rate of video information, and VBSV (VBV Buffer Size Value) is defined as a parameter relating to capacity of buffer used when the video information is decoded.

(5) As values for quantization matrix in the DCT (Discrete Cosine Transform) inverse transform (image expansion), IQM (Intra Quantizer Matrix) and NIQM (Non Intra Quantizer Matrix) are defined.

(C) The picture layer includes parameters for definition of one frame when video information is reproduced as video. The parameters defines, as parameters relating to motion vector with respect to a reference picture (I picture etc.), MMF(Macroblock Motion Forward), MMB(Macroblock Motion Backward), etc.

(D) The macroblock layer is a unit of coding, which includes parameters for definition of pixel blocks (macroblock) which are obtained by dividing one frame into a certain size. This macroblock corresponds to unit information in the claims. Accordingly, the macroblock is referred to as unit information as needed in the description provided below.

(6) MBT (Macroblock type) is defined as a parameter for defining the coding mode of the macroblock, and QSC (Quantizer Scale Code) is defined to define the quantization step size of the macroblock.

(7) MHC (Motion Horizontal Code) and MVC (Motion Vertical Code) are defined which are coding values relating to motion vector with respect to the macroblock immediately before.

(E) The block layer includes a DCT transform coefficient representing luminance and color difference in that macroblock. In more detail, it has DDSL (DCT DC Size Luminance) which is a DCT coefficient for representing luminance, DDSC (DCT DC Size Chrominance) which is a DCT coefficient for representing color difference, etc.

FIG. 2 is a diagram showing information stored in the second to fourth temporary storage areas 32 to 34 included in the RAM 3 mentioned above. FIG. 2(a) shows the information stored in the second temporary storage area 32. In FIG. 2(a), the original video-audio information outputted from the receiver 7 or the second recording device 8 and provided as input to the information recording device is stored unchanged in the second temporary storage area 32.

Figure 2B:
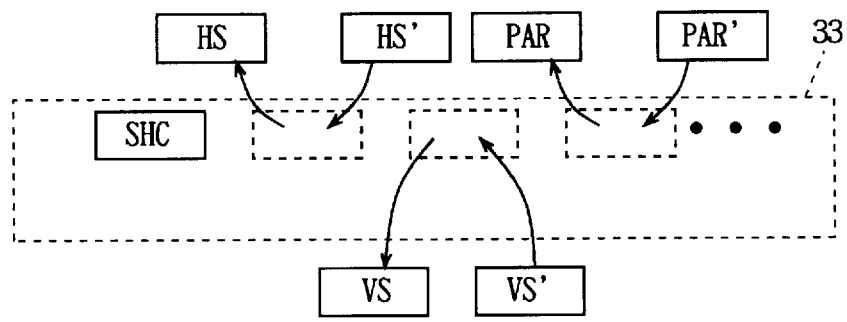

FIG. 2(b) shows information stored in the third temporary storage area 33. In FIG. 2(b), the third temporary storage area 33 stores information obtained by decomposing the video-audio information stored in the second temporary storage area 32 for each parameter and into original video information and audio information. The MPU 1 applies processings to the parameters etc. stored in the third temporary storage area 33, such as the processing of extracting quality deterioration parameters (refer to FIG. 3, step S303), which will be described in detail later.

Figure 2C:
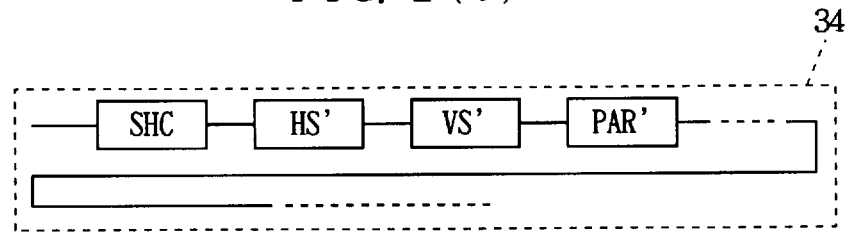

FIG. 2(c) shows information stored in the fourth temporary storage area 34. In FIG. 2(c), the fourth temporary storage area 34 stores video-audio information (quality deteriorated) composed by using auxiliary information which has been subjected to the processing of converting quality deterioration parameters, as will be fully described later (refer to steps S303 and S304 shown in FIG. 3). The video-audio information (quality deteriorated) stored in the fourth temporary storage area 34 is recorded on the copy target recording medium 41.

To clarify the description, FIG. 2(a)–(c) do not show all video-audio information but shows only part of it which is particularly necessary in this embodiment.

Figure 3:
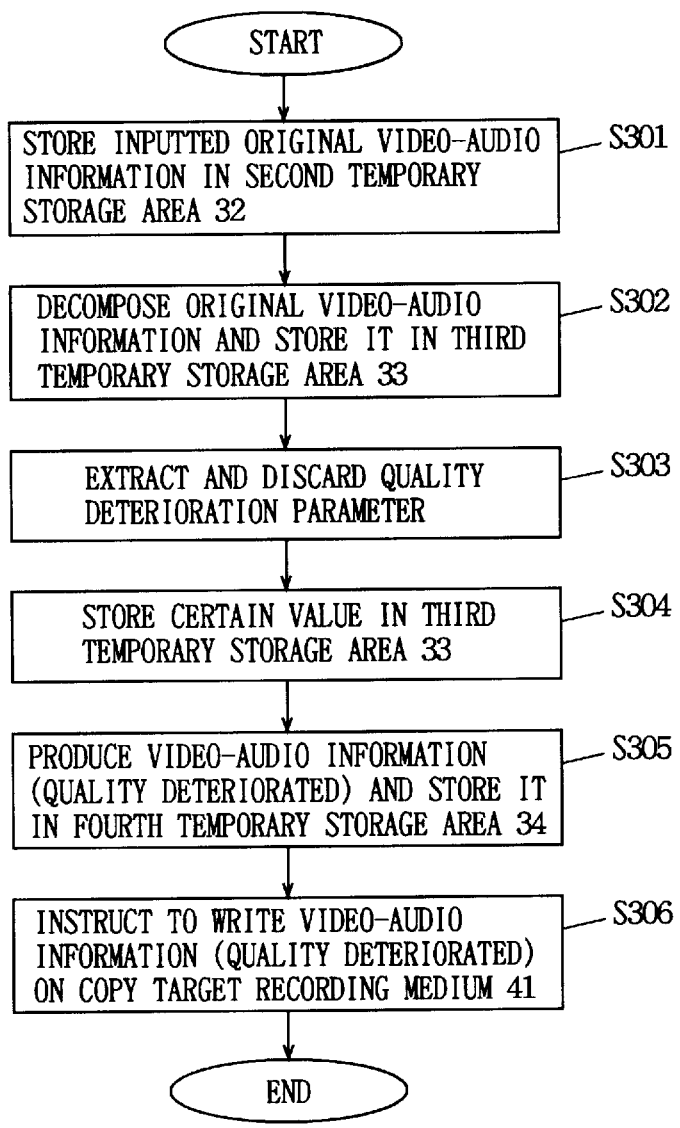
FIG. 3 is a flow chart showing the procedure of processing performed by the information recording device shown in FIG. 1.

FIG. 3 is a flow chart showing the procedure of the processing performed by the information recording device shown in FIG. 1.

Now, referring to FIG. 1 to FIG. 3, the procedure of the processing performed by the information recording device according to this embodiment will be described in detail.

In the information recording device, at the time of start, the MPU 1 stores the program 21 stored in the ROM 2 into the first temporary storage area 31. The MPU 1 stores into the second temporary storage area 32 the original video-audio information outputted from the receiver 7 or the second recording device 8 and supplied as input through the I/O interface 5 (Refer to step S301, FIG. 2(a).) That is to say, the video-audio information having the MPEG 2 stream format, for example, is intactly stored in the second temporary storage area 32.

The MPU 1 detects the stream ID in the system layer from the original video-audio information stored in the second temporary storage area 32 and decomposes the audio-video information into video information and audio information. As to the video information, the MPU 1 detects the synchronization hedder code (SHC; Sequence Header Code) in the sequence layer and decomposes the video information for each parameter (the above-described HSV, VSV, ARI, etc.) stored in a certain bit position on the basis of the sequence hedder code detected, and further for each unit information (macroblock), and then stores it into the third temporary storage area 33 (Step S302).

When the processing in Step S302 is finished, the MPU 1 extracts and discards parameters previously defined in the program 21 (hereinafter, referred to as quality deterioration parameters) (Step S303). In more detail, the MPU 1 extracts and discards quality deterioration parameters stored in certain bit positions in the video-audio information from the address areas in the third temporary storage area 33 which correspond to those bit positions. After that, the MPU 1 stores certain values defined by the program 21 in the address areas in which the quality deterioration parameters were stored in the third temporary storage area 33, thereby converting the quality deterioration parameters into the certain values (Step S304).

Now, a specific example of the above-described Step S303 and Step S304 will be described. It is assumed that HSV, VSV and ARI are defined as the quality deterioration parameters in the program 21 and HSV', VSV' and ARI' are defined as corresponding certain values. In this case, the MPU 1 extracts HSV, VSV and ARI from the third temporary storage area 33 and discards them (Step S303), and then stores the certain values HSV', VSV' and ARI' into the address areas where they were stored. (Refer to FIG. 2(b), Step S304.)

When the processing in the Step S304 is finished, the MPU 1 composes the parameters etc. stored in the third temporary storage area 33 to generate video-audio information including the certain values in the bit positions corresponding to the quality deterioration parameters (the video-audio information corresponds to the aforementioned video-audio information (quality deteriorated)), which is stored in the fourth temporary storage area 34. (Step S305, FIG. 2(c).)

Next, the MPU 1 outputs the video-audio information (quality deteriorated) stored in the fourth temporary storage area 34 to the first recording device 4 and instructs the first recording device 4 to write that video-audio information (quality deteriorated) on the copy target recording medium 41 (Step S306). In response to this instruction, the first recording device 4 writes the video-audio information (quality deteriorated) on the copy target recording medium 41, and thereby a copy of the original video-audio information supplied from the receiver 7, or the like, is completed, ending the processing by this information recording device.

Next, effects of the information recording device according to this embodiment will be described using the specific example described above. The HSV defines the number of horizontal pixels in a screen in reproduced video, the VSV defines the number of vertical lines in the screen, and the ARI is a parameter for defining the aspect ratio of the screen. Hence, in the original video-audio information, HSV, VSV and ARI have code values "X", "Y" and "0110", for example. When they are converted into the certain values HSV' (="X'"), VSV' (="Y'") and ARI' (="1100"), the video-audio information (quality deteriorated) written into the copy target recording medium 41 has those certain values. Accordingly, when the video-audio information (quality deteriorated) is reproduced as video, its aspect ratio, which has been originally 16:9, becomes 4:3, and the numbers of the horizontal pixels and vertical lines, which have been originally "X" and "Y", become "X'" and "Y'". This way, the video-audio information including the certain values as auxiliary information is not the same as the original video-audio information any longer. The video-audio information inputted from the receiver 7 or the like, which is to be protected by the copyright, can thus be protected.

Although it is necessary in the actual processing to define a reference position for the numbers of horizontal pixels and vertical lines, it is not described herein because it is not related to the quality deterioration, the main idea of the present invention.

Next, a second embodiment of the present invention will be described.

Figure 4:
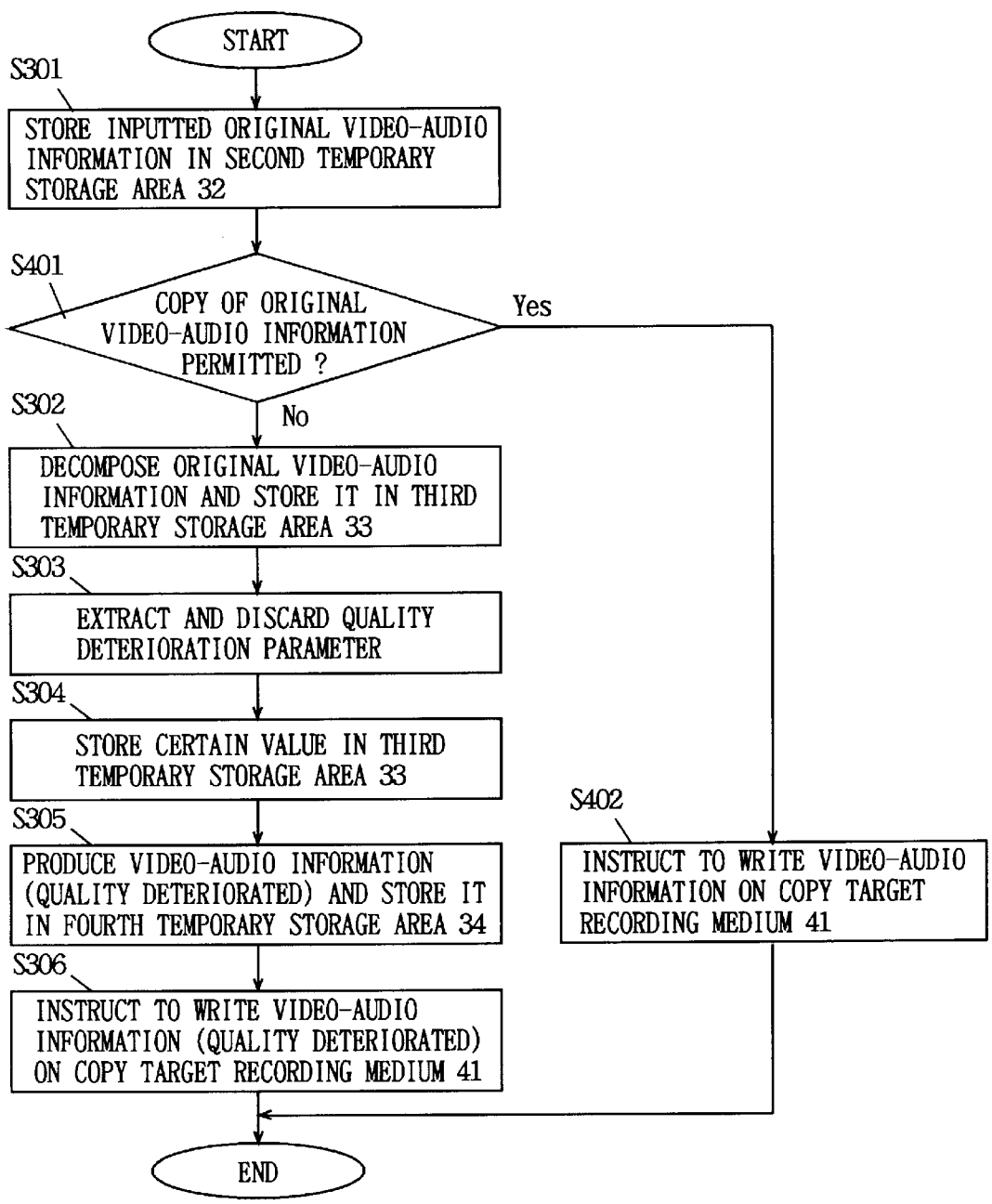
FIG. 4 is a flow chart showing the operating procedure of an information recording device according to a second embodiment of the present invention.

The information recording device according to this embodiment differs from the information recording device of the first embodiment (refer to FIG. 1) in that it has a data input device such as a ten-key and that the MPU 1 performs the processing shown in FIG. 4 instead of the processing shown in FIG. 3. Since the structure of the information recording device according to this embodiment is the same as that of the first embodiment in other respects, the parts corresponding to those in the structure shown in FIG. 1 are shown at the same reference numerals and detailed descriptions thereof are not repeated here.

FIG. 4 is a flow chart showing the procedure of the processing performed by the information recording device of this embodiment. In FIG. 4, the processing procedure of this embodiment differs from that of the first embodiment in that it further includes Steps S401 and S402. In other respects, it is the same as the processing procedure according to the first embodiment (refer to FIG. 3), and therefore the corresponding steps are shown at the same step numbers and description thereof is briefly provided.

Now, referring to FIGS. 1, 2 and 4, the processing performed by the information recording device of this embodiment will be described.

The MPU 1 stores the original video-audio information inputted from the receiver 7, or the like, into the second temporary storage area 32 (Step S301, refer to FIG. 2(*a*)), and then it determines whether to record it on the copy target recording medium 41 without deteriorating its quality or to record it with its quality deteriorated (Step S401). In order to make this determination, the MPU 1 provides speech output, as "Please enter a password", for example, to ask an operator operating the information recording device to enter a password. If the operator is permitted to copy the original video-audio information by the copyright holder and allowed a password by that copyright holder, then he/she operates a data input device (not shown) to input the password. If the operator does not have a password, then he/she operates the data input device to enter a command indicative of that fact, for example.

When such a command is inputted, the MPU 1 deteriorates the quality of the original video-audio information currently stored in the second temporary storage area 32. That is to say, the MPU 1 carries out the same processes as the Steps S302 to S306 described in detail in the first embodiment and instructs the first recording device 4 to write the video-audio information (quality deteriorated) obtained by this processing on the copy target recording medium 41. In response to this instruction, the first recording device 4 writes the video-audio information (quality deteriorated) on the copy target recording medium 41.

On the other hand, if a correct password is entered after asking entry of a password, then the MPU 1 moves to the Step S402 to output the video-audio information currently stored in the second temporary storage area 32 to the first storage device 4 and instruct the first recording device 4 to write the video-audio information on the copy target recording medium 41 (Step S402). In response to this instruction, the first recording device 4 writes the inputted video-audio information on the copy target recording medium 41. In this case, video-audio information completely the same as the original is recorded on the copy target recording medium 41 on the basis of the intention of the copyright holder.

Next, a third embodiment of the present invention will be described.

Figure 5:
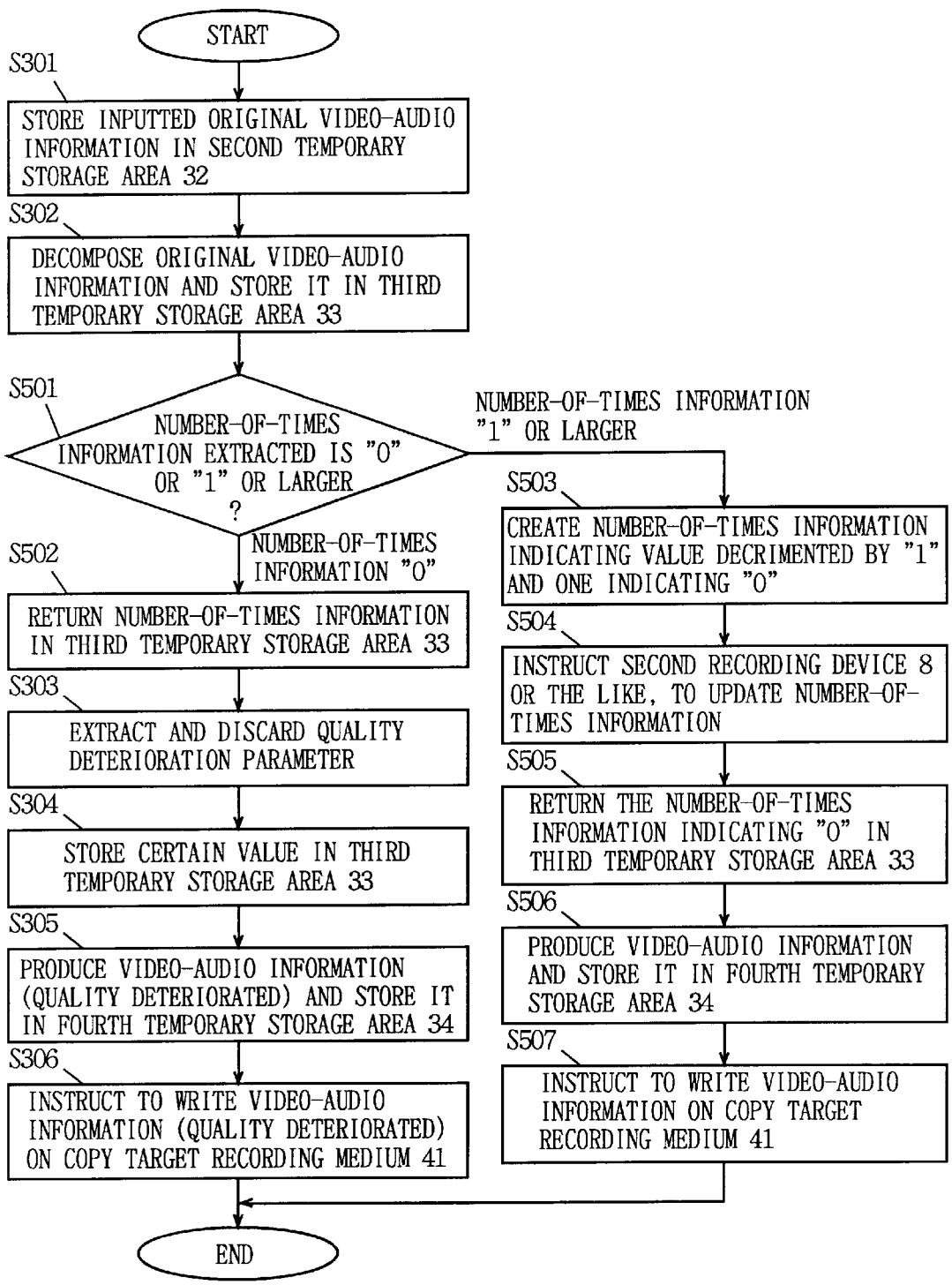
FIG. 5 is a flow chart showing the operating procedure of an information recording device according to a third embodiment of the present invention.
Figure 6:
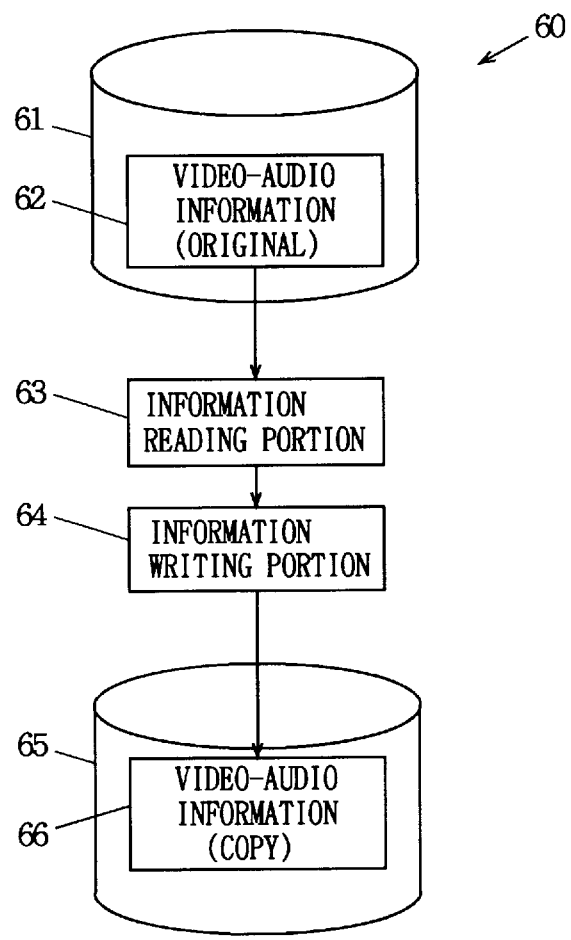
FIG. 6 is a block diagram showing the structure of a conventional information recording device.

The structure of the information recording device according to this embodiment is the same as that of the information recording device according to the first embodiment (refer to FIG. 1) and therefore the corresponding parts are shown at the same reference numerals and description thereof is not repeated. However, it differs from the first embodiment in that the MPU 1 performs the processing shown in FIG. 5 instead of that shown in FIG. 3. FIG. 5 is a flow chart showing the procedure of processing performed by the information recording device of the third embodiment of the present invention. In FIG. 5, the processing procedure of the third embodiment is different from that of the first embodiment in that Steps S501 to S507 are further included. In other respects, it is the same as the processing procedure of the first embodiment (refer to FIG. 3) and therefore the corresponding steps are shown at the same step numbers and description thereof is simplified.

The video-audio information fed into the information recording device of this embodiment differs from that fed into the information recording device of the first embodiment in that it further includes information as to how many times it is permitted to copy the video-audio information without deteriorating the quality (hereinafter, the information is referred to as number-of-times information). In other respects, it is the same as that described in the first embodiment and it is not described again.

Furthermore, the second recording device 8 connected to the I/O interface 5 of the information recording device of this embodiment differs from the second recording device 8 of the first embodiment in that it has structure capable of read and write.

Now, referring to FIGS. 1, 2 and 5, the processing performed by the information recording device of this embodiment will be described.

The MPU 1 stores the original video-audio information provided from the receiver 7 or the second recording device 8 into the second temporary storage area 32 (Step S301, refer to FIG. 2(*a*)). The MPU 1 decomposes the video-audio information stored in the second temporary storage area 32 for each parameter, and further, for each unit information, and stores them into the third temporary storage area 33 (Step S302). The video-audio information includes the number-of-times information as stated above. When the processing of the Step S302 is finished, the MPU 1 extracts the number-of-times information from the decomposed video-audio information and determines whether the extracted number-of-times information indicates "0" or it indicates "1" or more (Step S501).

When it is determined in the processing of Step S501 that the number-of-times information is "0", the MPU 1 returns the number-of-times information to the address area in which it was originally stored in the third temporary storage area 33 (Step S502). After that, the MPU 1 deteriorates the quality of the original video-audio information currently stored in the second temporary storage area 32. That is to say, the MPU 1 performs the same processings as the Steps S303 to S306 explained in detail in the first embodiment and instructs the first recording device 4 to write the video-audio information (quality deteriorated) obtained by such processings on the copy target recording medium 41. In response to this instruction, the first recording device 4 writes the video-audio information (quality deteriorated) on the copy target recording medium 41.

On the other hand, if the number-of-times information is determined to be "1" or larger in the Step S501, the MPU 1 decrements the indicated value of the extracted number-of times information by "1" and it also creates one having an indicated value of "0" (Step S503). The MPU 1 outputs the number-of-times information with its indicated value decremented by "1" to the second recording device 8, or the like, and also instructs the second recording device 8 to update the number-of-times information included in the original video-audio information recorded on the copy source recording medium 81 or the like to the number-of-times information with the indicated value decremented by "1" (Step S504). The second recording device 8, or the like, which receives the number-of-times information with its indicated value decremented by "1" and the above instruction, updates the number-of-times information included in the original video-audio information recorded in the copy source recording medium 81, or the like, to the number-of-times information inputted (that having its indicated value decremented by "1"). This can limit the number of times of copying the video-audio information recorded on the copy source recording medium 81. The MPU 1 also returns the number-of-times information with its indication value "0" into the address area in which the number-of-times information extracted from the third temporary storage area 33 was originally stored (Step S505).

Next, the MPU 1 composes the parameters and the like currently stored in the third temporary storage area 33 to produce video-audio information again, which is stored in the fourth temporary storage area 34 (Step S506). The MPU 1 outputs the video-audio information stored in the fourth temporary storage area 34 to the first recording device 4 and also instructs the first recording device 4 to write that video-audio information on the copy target recording medium 41 (Step S507). In response to this instruction, the first recording device 4 writes the inputted video-audio information on the copy target recording medium 41. In this case, the very same video-audio information as the original one is recorded on the copy target recording medium 41 on the basis of the intention of the copyright holder.

In the embodiment described above, the MPU 1 defines HSV, VSV and ARI explained in (B)(3) as the quality deterioration parameters and converts them into certain values to deteriorate the quality of the video-audio information. However, if the parameters mentioned in the above (A) to (F) are defined as the quality deterioration parameters, the quality of the video-audio information is deteriorated in manners which depend on the parameters. Now, this will be described below.

When the MPU 1 defines BRV and VBSV explained in (B)(4) as the quality deterioration parameters and converts them into certain values BRV' and VBSV', the number of times of frame dropping can be increased when decoding the video-audio information. Accordingly, when the video-audio information including the certain values BRV' and VBSV' is reproduced in a television, or the like, the number of frames per unit time decreases and the quality of the video-audio information is thus deteriorated.

When the MPU 1 defines IQM and NIQM explained in (B)(5) as the quality deterioration parameters and converts them into certain values IQM' and NIQM', then the quantization matrix is changed when the video-audio information is DCT inverse-transformed (image expansion). Accordingly, if the video-audio information including the certain values IQM' and NIQM' is reproduced in a television, or the like, block distortion occurs, for example. Thus the quality of the video-audio information is deteriorated.

When the MPU 1 defines FHFC, FVFC, BHFC and BVFC explained in (C) as the quality deterioration parameters and converts them into certain values FHFC', FVFC', BHFC' and BVFC', then the motion vector changes. Accordingly, when the video-audio information including the certain values FHFC', FVFC', BHFC' and BVFC' is reproduced in a television or the like, it is possible to cause motions to differ from those in the reproduced video of the original video information. The quality of the video-audio information is thus deteriorated.

When the MPU 1 defines MBT and QSC explained in (D)(6) as the quality deterioration parameters and converts them into certain values MBT' and QSC', then the coding mode and the quantization step size in that macroblock change. Accordingly, when the video-audio information including the certain values MBT' and QSC' is reproduced in a television or the like, block distortion or the like occurs in the portion corresponding to the macroblock with the converted certain values. The quality of the video-audio information is thus deteriorated.

When the MPU 1 defines MHC and MVC explained in (D)(7) as the quality deterioration parameters and converts them into certain values MHC' and MVC', then the motion vector in that macroblock changes. Accordingly, when the video-audio information including the certain values MHC' and MVC' is reproduced in a television or the like, it is possible to make motion in the portion corresponding to the macroblock with the converted certain values differ from that in the reproduced video of the original video-audio information. The quality of the video-audio information is thus deteriorated.

When the MPU 1 defines PTS and DTS explained in (A)(1) as the quality deterioration parameters and converts the values into certain values PTS' and DTS', then the synchronization between video and audio is disturbed or one of them is delayed, resulting in deterioration of the quality of the video-audio information.

When the MPU 1 defines the stream ID explained in (A)(2) as the quality deterioration parameter and converts it into a certain value, it is possible to eliminate sound in reproduced video to deteriorate the quality of the video-audio information.

In the description above, parameters included in the auxiliary information are defined as the quality deterioration parameters to deteriorate quality of video-audio information. However, if the MPU 1 extracts unit information from the third temporary storage area 33 and deteriorates the quality of the extracted unit information, the same effects can be obtained. Now, it will be described in detail.

The MPU 1 extracts and discards DDSL, DDSC, etc. explained in (E) as unit information from the third temporary storage area 33 according to the program 21. The MPU 1 stores certain values for degrading the quality of the extracted unit information in the third temporary storage area 33 to convert the unit information to be deteriorated into the certain values. When the DDSL and/or DDSC, etc. included in a macroblock are converted into the certain values for deterioration, then luminance and/or color in the portion corresponding to that macroblock change in reproduced video of the video-audio information.

Now, the method for extracting the unit information will be described.

First, as a first method, the MPU 1 intermittently (at certain intervals) extracts unit information from all unit information decomposed and stored in the third temporary storage area 33 and deteriorates the information so that the luminance and/or color partially change in the reproduced video.

As a second method, the MPU 1 extracts and deteriorates all unit information decomposed and stored in the third temporary storage area 33 so that the luminance and/or color change throughout the reproduced video.

As a third method, the MPU 1 extracts and deteriorates unit information (DDSL and/or DDSC, etc.) included in I picture (intra picture) included in the GOP layer from the all unit information decomposed and stored in the third temporary storage area 33. In such a case, the deterioration extends to B picture which is predicted referring to that I picture and luminance and/or color in the portion corresponding to the GOP layer change in the reproduced video.

In the first through third embodiments described above, the second recording device 8 for setting the copy source recording medium 81 is connected to the information recording device through the I/O interface 5. However, the second recording device 8 may be directly connected to the system bus 6, i.e., the first and second recording devices 4 and 8 may be included in the information recording device.

In the first through third embodiments above, the first recording device 4 into which the copy source recording medium 41 is set is connected to the system bus 6 and the second recording device 8 into which the copy source recording medium 81 is set is connected to the I/O interface 5. However, the second recording device 8 may be connected to the system bus 6 with the first recording device 4 connected to the I/O interface 5. Furthermore, a transmitter for transmitting video-audio information (quality deteriorated) may be connected to the I/O interface 5 to transmit the information to the outside in the on-line, off-line or broadcasting form. The password described in the second embodiment, in this structure, is not used for determining whether to record the video-audio information on the copy target recording medium 41 without detriorating its quality or to deteriorate its quality and record the same, but for determining whether to output the video-audio information to the outside without deteriorating its quality. The number-of-times information described in the third embodiment is not the information as to how many times it is permitted to copy the video-audio information without deteriorating its quality, but the information as to how many times it is permitted to output the video-audio information without deteriorating its quality.

Furthermore, although the video-audio information has been described as having the stream format of MPEG 2 in the embodiments, it can be applied also to the video-audio information having the stream format adopted in DVC (Digital Video Cassette). In (A) to (E) described above, however, the stream format adopted in DVC does not define FHFC, FVFC, BHFC and BVFC mentioned in (C), MBT and QSC mentioned in (D) (6) and I picture. Therefore they can not be used as the quality deterioration parameters or the unit information for deterioration.

The embodiments are also applicable to video information only, or to audio information only.

While the invention has been described in detail, the foregoing description is in all aspects illustrative and not restrictive. It is understood that numerous other modifications and variations can be devised without departing from the scope of the invention.

I claim:

1. A device for recording digital information inputted in an on-line, off-line or broadcasting form on a copy target recording medium, wherein the digital information includes video information and/or audio information and parameters for reproducing the video information and/or the audio information as video and/or audio, said information recording device comprising:

decomposing means for decomposing the inputted digital information into one or a plurality of certain parts;

extracting means for extracting part of the parameters as a quality deterioration parameter from the digital information decomposed by said decomposing means;

converting means for converting the quality deterioration parameter extracted by said extracting means into a value which deteriorates the quality of the digital information;

composing means for composing the digital information decomposed by said decomposing means to reconstruct recomposed digital information including said value in a portion of said recomposed digital information corresponding to said quality deterioration parameter; and writing means for writing said recomposed digital information composed by said composing means on the copy target recording medium.

2. The information recording device according to claim 1, wherein the inputted digital information includes at least video information, and said extracting means extracts as said quality deterioration parameter a parameter defining a screen size when the video information is reproduced as video from the digital information decomposed by said decomposing means.

3. The information recording device according to claim 1, wherein the inputted digital information includes at least video information, and said extracting means extracts as said quality deterioration parameter a parameter defining the number of frames per unit time when the video information is reproduced as video from the digital information decomposed by said decomposing means.

4. The information recording device according to claim 1, wherein the inputted digital information includes at least video information, and said extracting means extracts as said quality deterioration parameter a quantization matrix required when image-expanding the video information from the digital information decomposed by said decomposing means.

5. The information recording device according to claim 1, wherein the inputted digital information includes at least video information, and said extracting means extracts as said quality deterioration parameter a parameter relating to a motion vector when decoding the video information from the digital information decomposed by said decomposing means.

6. The information recording device according to claim 1, wherein the inputted digital information includes at least video information, and said extracting means extracts as said quality deterioration parameter a parameter defining the resolution when reproducing the video information as video from the digital information decomposed by said decomposing means.

7. The information recording device according to claim 1, wherein the inputted digital information includes video information and audio information, and
said extracting means extracts as said quality deterioration parameter a parameter defining the relation between the video information and the audio information from the digital information decomposed by said decomposing means.

8. The information recording device according to claim 1, further comprising reading means for reading digital information recorded on a copy source recording medium,
wherein said decomposing means receives the digital information read by said reading means as input.

9. The information recording device according to claim 1,
further comprising determination means for determining whether to write the digital information inputted to said decomposing means on the copy target recording medium without deteriorating its quality on the basis of externally inputted permit/unpermit information, which is indicative of whether or not to permit writing the digital information inputted into said decomposing means on the copy target recording medium without deteriorating quality of the digital information.

10. The information recording device according to claim 1, wherein the digital information inputted to said decomposing means further includes number-of-times information indicative of how many times the digital information can be written on the copy target recording medium without deteriorating its quality,
wherein said information recording device further comprises determination means for extracting the number-of-times information from the digital information decomposed by said decomposing means and for determining on the basis of the extracted number-of-times information whether to write the digital information inputted to said decomposing means on the copy target recording medium without deteriorating its quality.

11. The information recording device according to claim 8, wherein the inputted digital information includes at least video information, and
said extracting means extracts as said quality deterioration parameter a parameter defining a screen size when the video information is reproduced as video from the digital information decomposed by said decomposing means.

12. The information recording device according to claim 8, wherein the inputted digital information includes at least video information, and
said extracting means extracts as said quality deterioration parameter a parameter defining the number of frames per unit time when the video information is reproduced as video from the digital information decomposed by said decomposing means.

13. The information recording device according to claim 8, wherein the inputted digital information includes at least video information, and
said extracting means extracts as said quality deterioration parameter a quantization matrix required when image-expanding the video information from the digital information decomposed by said decomposing means.

14. The information recording device according to claim 8, wherein the inputted digital information includes at least video information, and
said extracting means extracts as said quality deterioration parameter a parameter relating to a motion vector when decoding the video information from the digital information decomposed by said decomposing means.

15. The information recording device according to claim 8, wherein the inputted digital information includes at least video information, and
said extracting means extracts as said quality deterioration parameter a parameter defining the resolution when reproducing the video information as video from the digital information decomposed by said decomposing means.

16. The information recording device according to claim 8, wherein the inputted digital information includes video information and audio information, and
said extracting means extracts as said quality deterioration parameter a parameter defining the relation between the video information and the audio information from the digital information decomposed by said decomposing means.

17. A device for recording digital information inputted in an on-line, off-line, or broadcasting form on a copy target recording medium, wherein the digital information includes at least video information and/or audio information, the video information and/or the audio information being composed of a plurality of unit information, said information recording device comprising:
decomposing means for decomposing the inputted digital information into the plurality of unit information;
extracting means for extracting at least part of the plurality of unit information to be deteriorated in quality from the decomposed digital information;
deteriorating means for deteriorating the quality of the unit information extracted by said extracting means;
composing means for composing the digital information decomposed by said decomposing means to reconstruct recomposed digital information including the unit information deteriorated in quality; and
writing means for writing said recomposed digital information produced by said composing means onto the copy target recording medium.

18. The information recording device according to claim 17, wherein the inputted digital information includes at least video information, and
said extracting means intermittently extracts the unit information which, when deteriorated, causes the video information on a screen to intermittently deteriorate when the video information is reproduced as video.

19. The information recording device according to claim 17, wherein the inputted digital information includes at least video information, and
said extracting means extracts the unit information which, when deteriorated, causes the video information for each certain picture group to deteriorate when the video information is reproduced as video.

20. The information recording device according to claim 17, wherein the inputted digital information includes at least video information, and
said extracting means extracts the unit information which, when deteriorated, causes luminance and/or color in one or a plurality of certain parts on a screen to deteriorate when the video information is reproduced as video.

21. The information recording device according to claim 17, further comprising reading means for reading digital information recorded on a copy source recording medium, wherein said decomposing means receives as input the digital information read by said reading means.

22. The information recording device according to claim 17,
further comprising determination means for determining whether to write the digital information inputted to said decomposing means on the copy target recording medium without deteriorating its quality on the basis of externally inputted permit/unpermit information, which is indicative of whether to permit writing the digital information inputted into said decomposing means on the copy target recording medium without deteriorating the quality of the digital information.

23. The information recording device according to claim 17, wherein the digital information inputted to said decomposing means further includes number-of-times information indicative of how many times the digital information can be written on the copy target recording medium without deteriorating its quality,
wherein said information recording device further comprises determination means for extracting the number-of-times information from the digital information decomposed by said decomposing means and determining on the basis of the extracted number-of-times information whether to write the digital information inputted to said decomposing means on the copy target recording medium without deteriorating its quality.

24. The information recording device according to claim 21, wherein the inputted digital information includes at least video information, and
said extracting means extracts the unit information which, when deteriorated, causes the video information on a screen to intermittently deteriorate when the video information is reproduced as video.

25. The information recording device according to claim 21, wherein the inputted digital information includes at least video information, and
said extracting means extracts the unit information which, when deteriorated, causes the video information for each certain picture group to deteriorate when the video information is reproduced as video.

26. The information recording device according to claim 21, wherein the inputted digital information includes at least video information, and
said extracting means extracts the unit information which, when deteriorated, causes luminance and/or color in one or a plurality of certain parts on a screen to deteriorate when the video information is reproduced as video.

27. An information output device for deteriorating quality of digital information inputted in an on-line, off-line, or broadcasting form, wherein the digital information includes video information and/or audio information and parameters for reproducing the video information and/or the audio information as video and/or audio, said information output device comprising:
decomposing means for decomposing the inputted digital information into one or a plurality of certain parts;
extracting means for extracting a part of the parameters as a quality deterioration parameter from the digital information decomposed by said decomposing means,
converting means for converting the quality deterioration parameter extracted by said extracting means into a value which deteriorates the quality of the digital information;
composing means for composing the digital information decomposed by said decomposing means to reconstruct recomposed digital information including said value in a part of said recomposed digital information corresponding to the quality deterioration parameter; and
output means for outputting said recomposed digital information produced by said composing means in the on-line, off-line or broadcasting form.

28. The information output device according to claim 27, wherein the inputted digital information includes at least video information, and
said extracting means extracts as said quality deterioration parameter a parameter defining a screen size when the video information is reproduced as video from the digital information decomposed by said decomposing means.

29. The information output device according to claim 27, wherein the inputted digital information includes at least video information, and
said extracting means extracts as said quality deterioration parameter a parameter defining the number of frames per unit time when the video information is reproduced as video from the digital information decomposed by said decomposing means.

30. The information output device according to claim 27, wherein the inputted digital information includes at least video information, and
said extracting means extracts as said quality deterioration parameter a quantization matrix required when image-expanding the video information from the digital information decomposed by said decomposing means.

31. The information output device according to claim 27, wherein the inputted digital information includes at least video information, and
said extracting means extracts as said quality deterioration parameter a parameter relating to a motion vector when decoding the video information from the digital information decomposed by said decomposing means.

32. The information output device according to claim 27, wherein the inputted digital information includes at least video information, and
said extracting means extracts as said quality deterioration parameter a parameter defining the resolution when reproducing the video information as video from the digital information decomposed by said decomposing means.

33. The information output device according to claim 27, wherein the inputted digital information includes video information and audio information, and
said extracting means extracts as said quality deterioration parameter a parameter defining the relation between the video information and the audio information from the digital information decomposed by said decomposing means.

34. The information output device according to claim 27, further comprising determination means for determining whether to output the digital information inputted to said decomposing means from said output means without deteriorating its quality on the basis of externally inputted permit/unpermit information, which is indicative of whether or not to permit outputting the digital information inputted into said decomposing means without deteriorating its quality.

35. The information output device according to claim 27, wherein the digital information inputted to said decomposing means further includes number-of-times information indicative of how many times the digital information is permitted to be outputted without deteriorating its quality, wherein said information output device further comprises determination means for extracting the number-of-times information from the digital information decomposed by said decomposing means and determining whether to output the digital information inputted to said decomposing means from said output means without deteriorating its quality on the basis of the number-of-times information extracted.

36. An information output device for deteriorating quality of digital information inputted in an on-line, off-line, or broadcasting form, wherein the digital information includes at least video information and/or audio information, the video information and/or the audio information being composed of a plurality of unit information, said information output device comprising:

decomposing means for decomposing the input digital information into the plurality of unit information;

extracting means for extracting at least part of the plurality of unit information whose quality is to be deteriorated from the decomposed digital information;

deteriorating means for deteriorating the quality of the unit information extracted by said extracting means;

composing means for composing the digital information decomposed by said decomposing means to reconstruct recomposed digital information including the unit information having its quality deteriorated; and output means for outputting said recomposed digital information produced by said composing means in the on-line, off-line or broadcasting form.

37. The information output device according to claim 36, wherein the inputted digital information includes at least video information, and said extracting means extracts the unit information which, when deteriorated, causes the video information on a screen to intermittently deteriorate when the video information is reproduced as video.

38. The information output device according to claim 36, wherein the inputted digital information includes at least video information, and said extracting means extracts the unit information which, when deteriorated, causes the video information for each certain picture group to deteriorate when the video information is reproduced as video.

39. The information output device according to claim 36, wherein the inputted digital information includes at least video information, and said extracting means extracts the unit information which, when deteriorated, causes luminance and/or color in one or a plurality of certain parts on a screen to deteriorate when the information is reproduced as video.

40. The information output device according to claim 36, further comprising determination means for determining whether to write the digital information inputted to said decomposing means on the copy target recording medium without deteriorating its quality on the basis of externally inputted permit/unpermit information, which is indicative of whether or not to permit outputting the digital information inputted into said decomposing means on the copy target recording medium without deteriorating its quality.

41. The information output device according to claim 36, wherein the digital information inputted to said decomposing means further includes number-of-times information indicative of how many times the digital information is permitted to be outputted without deteriorating its quality, wherein said information output device further comprises determination means for extracting the number-of-times information from the digital information decomposed by said decomposing means and determining whether to output the digital information inputted to said decomposing means from said output means without deteriorating its quality on the basis of the number-of-times information extracted.

* * * * *